US009392515B2

(12) United States Patent
Wang et al.

(10) Patent No.: US 9,392,515 B2
(45) Date of Patent: Jul. 12, 2016

(54) DATA SPLIT BETWEEN MULTIPLE SITES

(75) Inventors: Carl Wang, Melville, NY (US); Kai Li, Flushing, NY (US); Sasidhar Movva, Wheatley Heights, NY (US); Philip Pietraski, Huntington Station, NY (US); Samian Kaur, Plymouth Meeting, PA (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 438 days.

(21) Appl. No.: 13/578,735

(22) PCT Filed: Feb. 11, 2011

(86) PCT No.: PCT/US2011/024438
§ 371 (c)(1),
(2), (4) Date: Feb. 27, 2013

(87) PCT Pub. No.: WO2011/100492
PCT Pub. Date: Aug. 18, 2011

(65) Prior Publication Data
US 2013/0176988 A1 Jul. 11, 2013

Related U.S. Application Data

(60) Provisional application No. 61/304,377, filed on Feb. 12, 2010, provisional application No. 61/303,769, filed on Feb. 12, 2010.

(51) Int. Cl.
*H04B 7/155* (2006.01)
*H04W 36/08* (2009.01)
(Continued)

(52) U.S. Cl.
CPC ........... *H04W 36/08* (2013.01); *H04B 7/15592* (2013.01); *H04W 28/08* (2013.01);
(Continued)

(58) Field of Classification Search
CPC .... H04B 7/15592; H04B 7/15; H04L 5/0035; H04L 45/00; H04L 47/10; H04L 47/27
See application file for complete search history.

(56) References Cited

U.S. PATENT DOCUMENTS 7,826,411 B2    11/2010    Gonikberg et al.
8,184,658 B1    5/2012    Chowdhuri et al.
(Continued)

FOREIGN PATENT DOCUMENTS

CN    1863344 A    11/2006
JP    2011-517536 A    6/2011
(Continued)

OTHER PUBLICATIONS

3rd Generation Partnership Project (3GPP), R1-090066, "Relaying for LTE-Advanced", Alcatel Shanghai Bell, Alcatel-Lucent, 3GPP TSG RAN WG1 Meeting #55bis, Ljubljana, Slovenia, Jan. 12-16, 2009, 9 pages.
(Continued)

*Primary Examiner* — Raj Jain
(74) *Attorney, Agent, or Firm* — Condo Roccia Koptiw LLP

(57) ABSTRACT

Splitting data in a wireless communications network. Data may be split to use multiple base stations for transmission to user equipment in order to improve the bandwith if a UE is on a cell edge, or may be split by user equipment for transmission to multiple base stations in order to improve handover. Data splitting may be performed at the Packet Data Convergence Protocol layer, at the Radio Link Control layer, or at the Media Access Control layer on user equipment or on a base station. Data may instead be split in a network node, such as in a serving gateway, in order to reduce X2 interface load or delay carrier aggregation.

7 Claims, 14 Drawing Sheets

(51) Int. Cl.
*H04W 28/08* (2009.01)
*H04B 7/15* (2006.01)
*H04B 7/02* (2006.01)
*H04W 36/28* (2009.01)
*H04W 92/10* (2009.01)
*H04W 92/20* (2009.01)

(52) U.S. Cl.
CPC .................. *H04B 7/022* (2013.01); *H04B 7/15* (2013.01); *H04W 36/28* (2013.01); *H04W 92/10* (2013.01); *H04W 92/20* (2013.01)

(56) References Cited

U.S. PATENT DOCUMENTS

| | | | |
|---|---|---|---|
| 8,498,284 B2* | 7/2013 | Pani | H04L 47/10 370/310 |
| 8,553,580 B2 | 10/2013 | Yin | |
| 2006/0056448 A1 | 3/2006 | Zaki et al. | |
| 2006/0121921 A1 | 6/2006 | Tajima et al. | |
| 2007/0201397 A1 | 8/2007 | Zhang | |
| 2007/0232358 A1 | 10/2007 | Sherman | |
| 2007/0286126 A1 | 12/2007 | Prakash et al. | |
| 2009/0122730 A1 | 5/2009 | Yang et al. | |
| 2009/0175214 A1* | 7/2009 | Sfar | H04B 7/15592 370/315 |
| 2009/0196259 A1 | 8/2009 | Pani et al. | |
| 2009/0238124 A1* | 9/2009 | Pragada | H04L 49/90 370/329 |
| 2009/0316659 A1 | 12/2009 | Lindoff et al. | |
| 2010/0020852 A1 | 1/2010 | Erell et al. | |
| 2010/0027471 A1 | 2/2010 | Palanki et al. | |
| 2010/0124291 A1 | 5/2010 | Muharemovic et al. | |
| 2010/0157944 A1 | 6/2010 | Horn | |
| 2010/0202392 A1 | 8/2010 | Zhang et al. | |
| 2010/0202394 A1 | 8/2010 | Zhang et al. | |
| 2010/0240375 A1 | 9/2010 | Ahluwalia | |
| 2010/0260111 A1 | 10/2010 | Sung et al. | |
| 2011/0044218 A1 | 2/2011 | Kaur et al. | |
| 2011/0134831 A1 | 6/2011 | Pirskanen | |
| 2011/0141959 A1 | 6/2011 | Damnjanovic et al. | |
| 2011/0275374 A1 | 11/2011 | Narasimha et al. | |
| 2011/0310859 A1 | 12/2011 | Vedantham et al. | |
| 2012/0083308 A1 | 4/2012 | Wang et al. | |
| 2012/0178454 A1 | 7/2012 | Kim et al. | |
| 2013/0083678 A1 | 4/2013 | Yin | |
| 2014/0010207 A1 | 1/2014 | Horn et al. | |
| 2015/0215898 A1* | 7/2015 | Nebat | H04L 12/1881 370/212 |

FOREIGN PATENT DOCUMENTS

| | | |
|---|---|---|
| JP | 2011-525327 A | 9/2011 |
| JP | 2011-530238 A | 12/2011 |
| JP | 2012-503347 A | 2/2012 |
| JP | 2013-502152 A | 1/2013 |
| KR | 20110124302 A | 11/2011 |
| KR | 20120027526 A | 3/2012 |
| WO | WO 2005/002141 A1 | 1/2005 |
| WO | WO 2009/120125 A1 | 10/2009 |
| WO | WO 2010/014969 A1 | 2/2010 |
| WO | WO 2010/144864 A1 | 12/2010 |
| WO | WO 2011/019501 A1 | 2/2011 |
| WO | WO 2012/074878 A2 | 7/2012 |
| WO | WO 2012/096502 A2 | 7/2012 |

OTHER PUBLICATIONS

3$^{rd}$ Generation Partnership Project (3GPP), R1-122402, "UL Transmissions in Case of Multiple TA", Nokia Siemens Networks, Nokia, 3GPP TSG RAN WG1 Meeting #69 Prague, Czech Republic, May 21-25, 2012, 4 pages.

Shen et al., "Overview of 3GPP LTE-Advanced Carrier Aggregation for 4G Wireless Communications", LTE Advanced and 4G Wireless Communications, Communications Magazine, IEEE, vol. 50, Issue: 2, Feb. 2012, 122-130.

3rd Generation Partnership Project; Technical Specification Group Radio Access Network; Evolved Universal Terrestrial Radio Access (E-UTRA) Radio Link Control (RLC) protocol specification (Release 8), 3GPP TS 36.322 V8.6.0, Jun. 2009, 39 pages.

3rd Generation Partnership Project; Technical Specification Group Radio Access Network; Evolved Universal Terrestrial Radio Access Network (E-UTRAN); X2 application protocol (X2AP) (Release 8), 3GPP TS 36.423 V8.6.0, Jun. 2009, 100 pages.

3rd Generation Partnership Project (3GPP), R1-090357, "Carrier Aggregation in Heterogeneous Networks", Qualcomm Europe, 3GPP TSG RAN WG1 #55bis, Ljubljana, Slovenia, Jan. 12-16, 2009, 12 pages.

3rd Generation Partnership Project (3GPP), Tdoc R2-092958, "Control plane aspects of carrier aggregation", Ericsson, 3GPP TSG RAN WG2 #66, San Francisco, USA, May 4-8, 2009, 4 pages.

3rd Generation Partnership Project (3GPP), R2-093104, "Carrier aggregation in active mode", Huawei, 3GPP TSG RAN WG2 Meeting #66, San Francisco, USA, May 4-8, 2009, 4 pages.

3rd Generation Partnership Project (3GPP), R2-093599, "LS on RAN2 status on carrier aggregation design", RAN 2, 3GPP TSG RAN WG2 Meeting #66, San Francisco, USA, May 4-8, 2009, 3 pages.

3rd Generation Partnership Project (3GPP), R2-093933, "Mobility Management Consideration for Carrier Aggregation", Huawei, 3GPP TSG RAN WG2 Meeting #66bis, Los Angeles, USA, Jun. 29-Jul. 3, 2009, 3 pages.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Physical Layer Procedures (Release 10)", Mar. 2011, pp. 1-76.

3rd Generation Partnership Project (3GPP), TS 36.321 V11.2.0, "Technical Specification Group Radio Access Network, Evolved Universal Terrestrial Radio Access (E-UTRA), Medium Access Control (MAC) Protocol Specification (Release 11)", Mar. 2013, pp. 1-56.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

* cited by examiner

DATA SPLIT BETWEEN MULTIPLE SITES

CROSS-REFERENCE TO RELATED APPLICATIONS

This application is the National Stage of PCT Application No. PCT/US2011/024438, filed Feb. 11, 2011; which claims the benefit of U.S. Provisional Application No. 61/303,769, filed Feb. 12, 2010, and U.S. Provisional Application No. 61/304,377, filed Feb. 12, 2010, the contents of which are hereby incorporated by reference herein.

BACKGROUND

In order to support higher data rate and spectrum efficiency, the Third Generation Partnership Project (3GPP) Long Term Evolution (LTE) system has been introduced into 3GPP Release 8 (R8). (LTE Release 8 may be referred to herein as LTE R8 or R8-LTE.) In LTE, transmissions on the uplink are performed using Single Carrier Frequency Division Multiple Access (SC-FDMA). In particular, the SC-FDMA used in the LTE uplink is based on Discrete Fourier Transform Spread Orthogonal Frequency Division Multiplexing (DFT-S-OFDM) technology. As used hereafter, the terms SC-FDMA and DFT-S-OFDM are used interchangeably.

In LTE, a wireless transmit/receive unit (WTRU), alternatively referred to as a user equipment (UE), transmits on the uplink using a limited, contiguous set of assigned sub-carriers in a Frequency Division Multiple Access (FDMA) arrangement. For example, if the overall Orthogonal Frequency Division Multiplexing (OFDM) signal or system bandwidth in the uplink is composed of useful sub-carriers numbered 1 to 100, a first given WTRU may be assigned to transmit on sub-carriers 1-12, a second WTRU may be assigned to transmit on sub-carriers 13-24, and so on. While the different WTRUs may each transmit into a subset of the available transmission bandwidth, an evolved Node-B (eNodeB) serving the WTRUs may receive the composite uplink signal across the entire transmission bandwidth.

LTE Advanced (which includes LTE Release 10 (R10), also referred to herein as LTE-A, LTE R10, or R10-LTE, and which may include future releases such as Release 11) is an enhancement of the LTE standard that provides a fully-compliant 4G upgrade path for LTE and 3G networks. In LTE-A, carrier aggregation is supported, and, unlike in LTE, multiple carriers may be assigned to the uplink, downlink, or both.

In both LTE and LTE-A, a UE, and therefore a user, may experience service degradation at a cell edge. Throughput, quality of service (QoS), and other factors may be affected by interference from other cells when a UE is operated at the edge of a cell. What is needed in the art are methods and systems that leverage the capabilities of LTE-A to address the problems with US operation at the edge of a cell

SUMMARY

Methods and systems splitting data in a wireless communications network are disclosed. Data may be split to use multiple base stations for transmission to user equipment, or may be split by user equipment for transmission to multiple base stations. In an embodiment. data splitting may be performed at the Packet Data Convergence Protocol (PDCP) layer. In an embodiment, data may be split at the Radio Link Control (RLC) layer. In an embodiment, data may be split at the Media Access Control (MAC) layer. In each of these embodiments, data may be split on user equipment and/or on a base station. In an embodiment, data may instead be split at the user plane, such as in a serving gateway. These and additional aspects of the current disclosure are set forth in more detail below.

BRIEF DESCRIPTION OF THE DRAWINGS

The following detailed description of disclosed embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
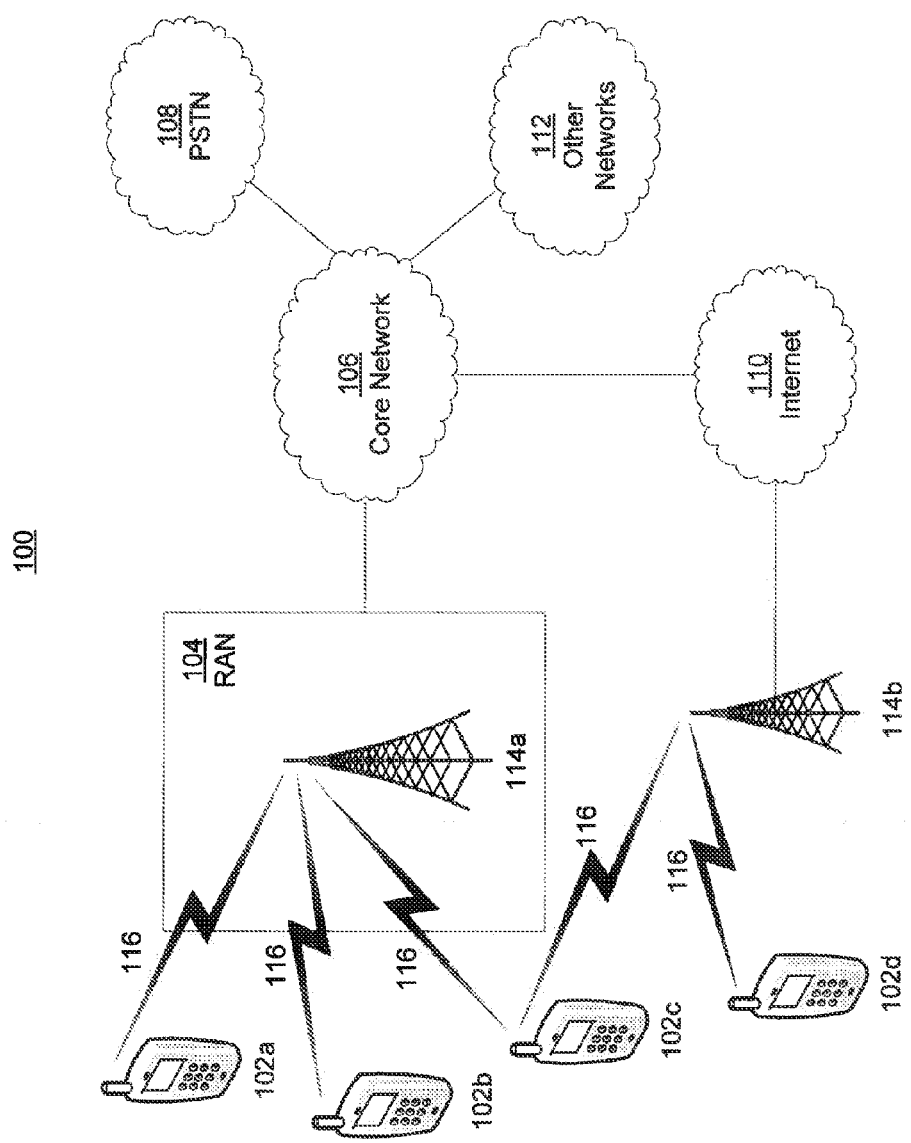
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNodeB, a Home Node B, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNodeB, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
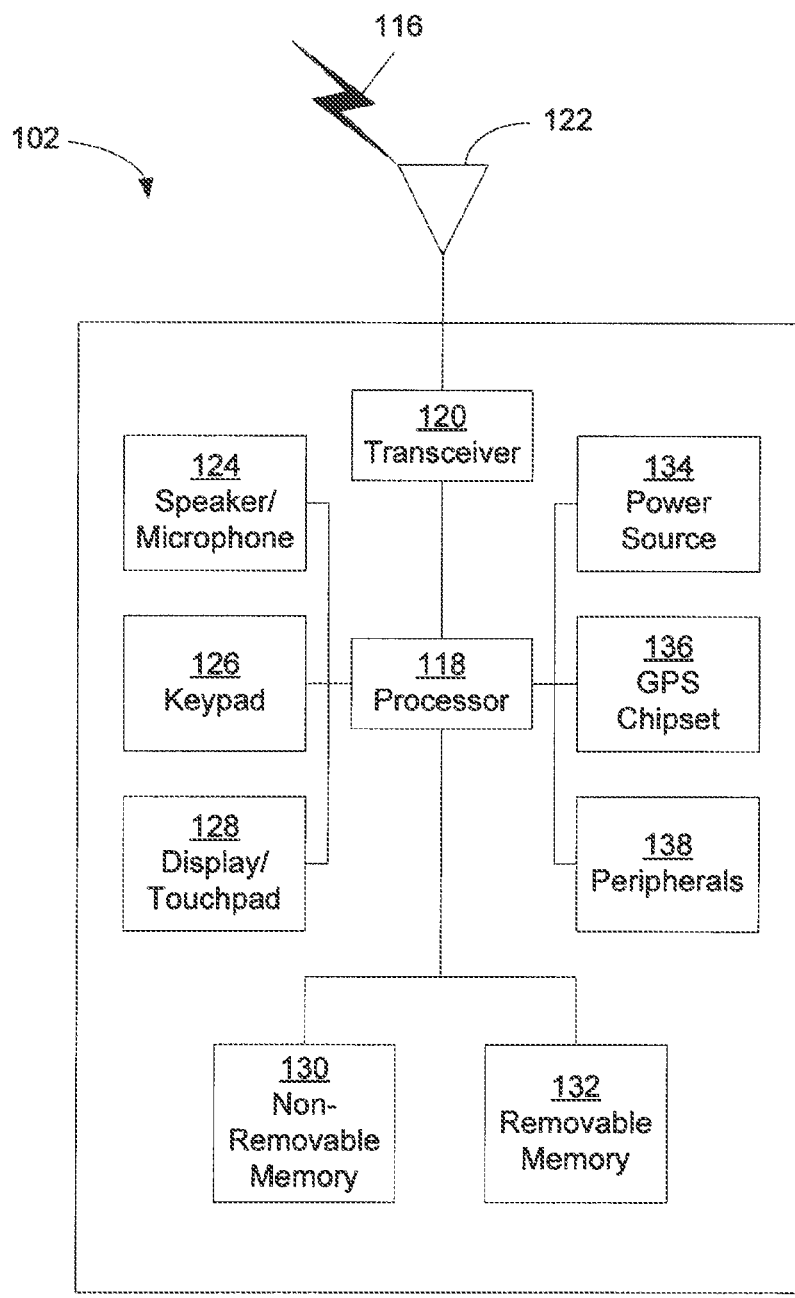
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is physically located remote from the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
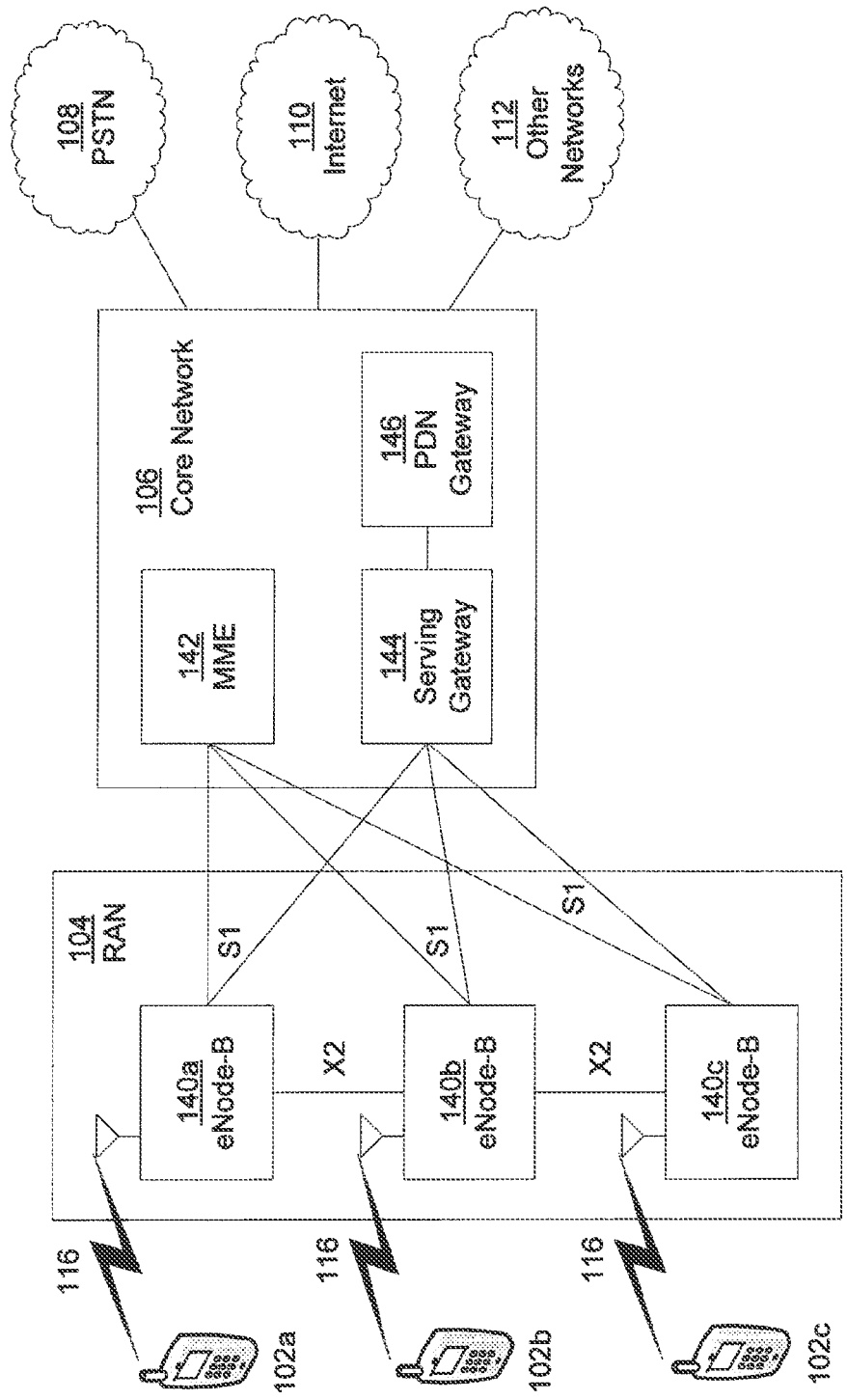
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNodeBs 140a, 140b, 140c, though it will be appreciated that the RAN 104 may include any number of eNodeBs while remaining consistent with an embodiment. The eNodeBs 140a, 140b, 140c may each include one or more transceivers for communicating with the WTRUs 102a, 102b, 102c over the air interface 116. In one embodiment, the eNodeBs 140a, 140b, 140c may implement MIMO technology. Thus, the eNodeB 140a, for example, may use multiple antennas to transmit wireless signals to, and receive wireless signals from, the WTRU 102a.

Each of the eNodeBs 140a, 140b, 140c may be associated with a particular cell (not shown) and may be configured to handle radio resource management decisions, handover decisions, scheduling of users in the uplink and/or downlink, and the like. As shown in FIG. 1C, the eNodeBs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNodeBs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNodeBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNodeB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The LTE downlink (DL) transmission scheme may be based on an OFDMA air interface. For the LTE uplink (UL) direction single-carrier (SC) transmission based on DFT-spread OFDMA (DFT-S-OFDMA) may be used. In the R8 LTE DL direction, a UE may be allocated by an eNodeB to receive its data anywhere across the whole LTE transmission bandwidth (e.g., an OFDMA scheme may be used.) The LTE DL may have an unused DC offset subcarrier in the center of the spectrum. In the R8 LTE UL direction, the R8 LTE system may be based on DTF-S-OFDMA or SC-FDMA transmission.

While a UE may, in the DL direction, receive its signal anywhere across the frequency domain of the entire LTE transmission bandwidth, in the UL direction a UE may transmit on a limited (or only on a limited), yet in an embodiment contiguous, set of assigned subcarriers in an Frequency Division Multiple Access (FDMA) arrangement. This arrangement may be referred to as Single Carrier (SC) FDMA. In an embodiment, if the overall OFDM signal or system bandwidth in the UL is composed of useful subcarriers numbered 1 to 100, a first given UE may be assigned to transmit its own signal on sub-carriers 1-12, a second given UE may transmit on subcarriers 13-24, and so on. An eNodeB may receive the composite UL signal across the entire transmission bandwidth from one or more UEs in the same time, but each UE may transmit (or only transmit) into a subset of the available transmission bandwidth. DFT-S-OFDM in the UL may therefore be viewed as a conventional form of OFDM transmission with the additional constraint that the time-frequency resource assigned to a UE must consist of a set of frequency-consecutive sub-carriers. In the UL, there may be no DC subcarrier. Frequency hopping may be applied in one mode of operation to UL transmissions by a UE.

LTE-A may support carrier aggregation (CA) and flexible bandwidth arrangement features. This may allow DL and UL transmission bandwidths to exceed 20 MHz (e.g., as in R8 LTE). For example, transmission bandwidths of 40 MHz or up to 100 MHz may be supported. In LTE R10, component carriers (CC) may enable this spectrum aggregation feature. In an embodiment, there may be up to 100 MHz aggregated spectrum, with 20 MHz maximum bandwidth for each CC, and therefore at least 5 CCs. In LTE-A, different CCs may have different coverage.

Figure 2:
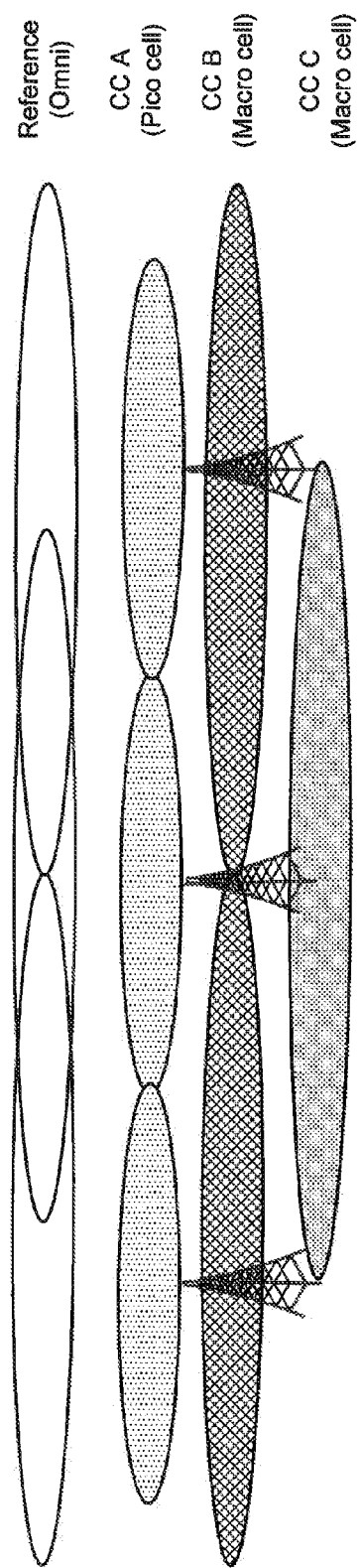
FIG. 2 illustrates a non-limiting exemplary network and component carrier configuration.

In an embodiment utilizing multiple CCs, in order to prevent or mitigate multicarrier interference, different cells may use different sets of CCs. Such cells may have different ranges and may have effective frequency reuse patterns greater than 1, as illustrated in FIG. 2.

Carrier aggregation using multiple CC may be relevant for UEs in an RRC CONNECTED state. Idle UEs may access the network via a single UL and DL carrier pair (e.g., using frequency division duplexing (FDD)). In an LTE-A embodiment, carrier aggregation in one serving eNodeB may be supported. This configuration may reduce the CA cell handover options to the allocation of target candidate CCs after handover or before handover. Allocating target candidates after handover may increase user plane delay, therefore allocation before handover may provide better performance, and may require adding an X2 interface message for measurement info exchange between a target and a source eNodeB.

It may be difficult to offer a uniform user experience (e.g., throughput, QoS, etc.) when a UE is at a cell edge because performance at cell-edge may be limited by interference from other cells. In an embodiment, CCs may be used to mitigate the cell edge problem when a UE is in a good coverage area of a certain CC at a given time. In an embodiment, overlaying CCs may be created with different cell edges by coordinating adjacent eNodeBs (cell sites) to vary the transmit power of each CC in a way that changes the distance to the cell edge, as show in FIG. 3.

Figure 3:
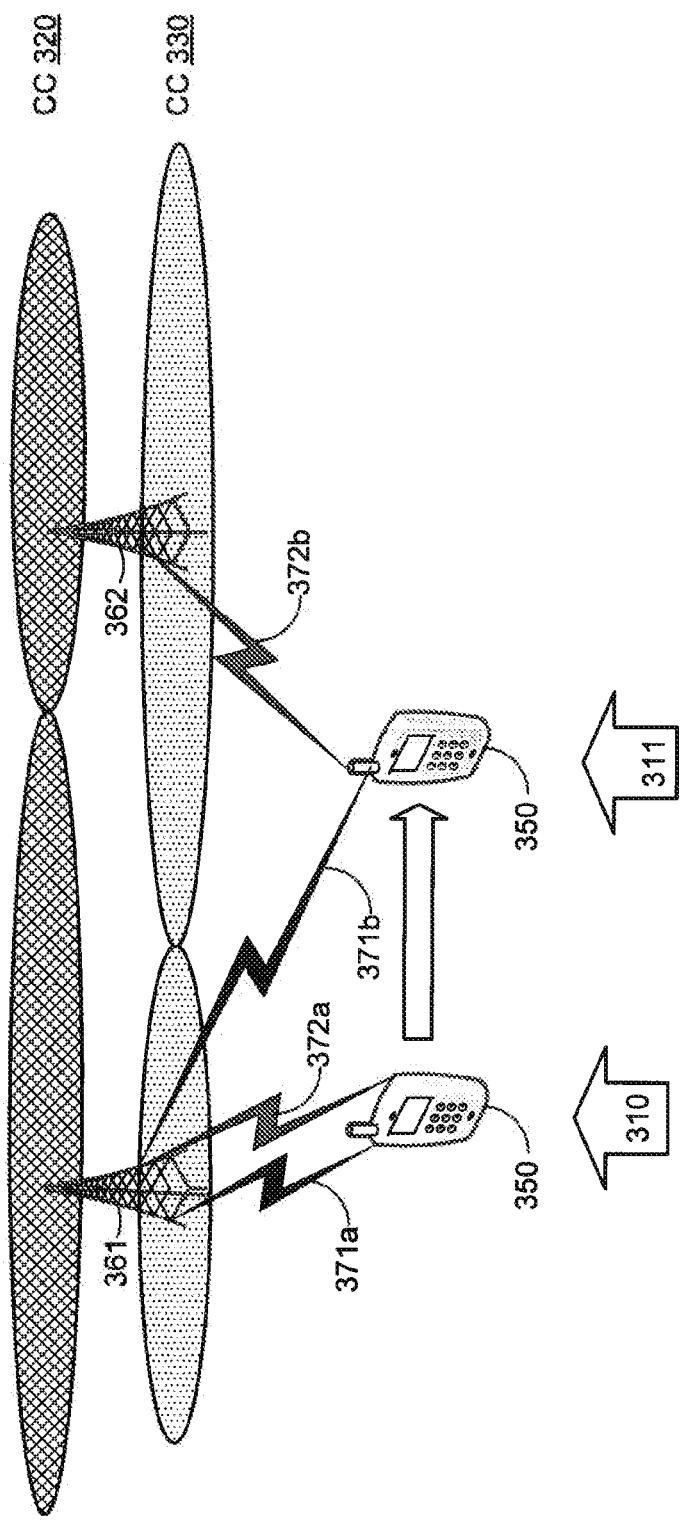
FIG. 3 illustrates another non-limiting exemplary network and component carrier configuration.

In FIG. 3, UE 350 may be at position 310 and may be communicating 371a via CC 320 with eNodeB 361, and may be communicating 372a via CC 330 with eNodeB 361. As UE 350 moves to new position 311, where CC 330 may be used with eNodeB 362, but CC 320 which remains within the cell boundary of eNodeB 361, UE 350 may still communicate 371b via CC 320 with eNodeB 361, but may now communicate 372b via CC 330 with eNodeB 362. This may enable UE 350 to stay near a cell center by handing over to different CCs at different locations while the network maintains a frequency reuse factor of 1. In this scenario, full capability base stations (including those with and without an associated radio head (RRH)) may be used that are each capable of supporting UEs on all CCs and where UEs are capable of receiving on a set of CCs in which each CC may be transmitted from a different site.

Note that while eNodeB 361 and eNodeB 362 are referred to as eNodeBs, these network elements may be any other type of device and/or network element that is capable of performing the functions described herein. For example, eNodeB 361 and/or eNodeB 362 may be a remote radio head (RRH), a sector antenna, any type of base station, or any combination of these or any other network element. Any such device or network element may be configured to perform any of the functions described herein that are described as being performed by a base station, eNodeB, gateway, node, or any other network element, and all such embodiments are contemplated as within the scope of the present disclosure.

In some LTE R10 implementations, support of multiple CCs for carrier aggregation may be limited to one serving eNodeB. This may prevent a UE from maintaining a data connection using one CC with different eNodeBs. In the scenario where a UE moves into a location where there is a coverage overlap for a CC on two different eNodeBs as shown in FIG. 3, the network radio resource management (RRM) entity may determine whether to handover to another cell site instead of taking full advantage of the data throughput increase by using multiple CCs from different sites. In order to take full advantage of available bandwidth on each CC, the corresponding data stream may be routed to and from the associated eNodeB.

Each data stream has associated resources (bandwidth and buffer) used to support transmission and reception. The aggregate bandwidth for each CC may be known by a network planner but the instantaneous bandwidth available for a UE on a CC is typically a dynamic decision of an eNodeB scheduler. The decision of how much data to send to each CC may have a direct impact on the resource requirements of each cooperating site. In an embodiment, a cooperating eNodeB may feed back information on its available resources, for example, to a serving eNodeB that may determine if and how to perform data splitting, and that may be configured to receive the complete (e.g., split ratio or unsplit) data flow.

In an embodiment, the data throughput of a service architecture evolution (SAE) bearer from eNodeB to a UE may be increased by coordinate splitting of data stream to multiple sites in the radio access network (RAN). The data splitting may be implemented at any layer of the RAN stack, including at the Packet Data Convergence Protocol layer (PDCP), the Radio Link Control (RLC) layer, the Media Access Control (MAC) layer, or at any combination or using any means as disclosed herein. Data splitting may also occur in the user plane. Systems and methods for performing such data splitting are disclosed in more detail herein.

Uplink data and downlink data may be split across multiple eNodeBs and other sites (e.g., an RRH) in the RAN. For DL data splitting, an eNodeB may split the incoming data stream into N streams corresponding to the number of cooperating CCs. Data splitting may be based on bandwidth availability as reported by cooperating CCs, a buffer status as reported from the buffering entity, and/or the data rate from bearer QoS requirement. An eNodeB may also support interactive procedures to determine how to split data, such as a loading sensitive mechanism. This mechanism may use an algorithm that is based on the instantaneous buffer status, another measure of buffer status (e.g., average) and/or bandwidth of an existing entity on the peer eNodeB. The flow control mechanism may be capable of buffering the data that is not yet acknowledged in order to recover from unrecoverable transmission errors on any of the cooperating CCs and/or buffering the data received from the data splitting entity and transmit it based on the bandwidth availability.

In DL data splitting, an eNodeB may also support the ability to add or remove cooperating CCs dynamically without tearing down the SAE bearer. The eNodeB may also support load monitoring of the transmission path in order to provide periodic and/or event triggered measurement reports on the current buffer status to the data splitting entity and to provide periodic and/or event triggered measurement report on the bandwidth utilization.

In DL data splitting, a UE may buffer the received data and perform reordering of the data received from different links to make sure that the data is provided to the upper layers in the order it was sent. This functionality may be used where layers above the entity do generally does not have the ability to perform such reordering (e.g., such as not having the ability to perform such reordering in the normal course of operation). A UE may also support in-sequence delivery and may configure affected layers to set up a data path that corresponds to the data stream splits.

In DL data splitting, the X2 interface (e.g., tunneling) may support certain functions. The X2 application protocol (X2 AP) may provide the configuration and controls of the data split entities and may be responsible for delivering measurement and/or bandwidth monitoring reports and delivering entity setup, modification, and/or release configuration. The X2 data transport or tunneling protocol may connect the data split entities between serving and cooperating eNodeBs to provide transmit and/or receipt of data between connected eNodeBs and/or transfer data control messages (e.g., reset messages, buffer status, bandwidth monitoring reports, etc.) between the two connected entities. The X2 data transport or tunneling protocol may also support flow control exchange over either the X2 AP or via in-band signaling through the tunneling protocol.

In UL data splitting, a UE may split the incoming data stream into N streams corresponding to the number of cooperating CCs. Data splitting may be based on the bandwidth availability as scheduled by cooperating CCs, the buffer status as reported from the buffering entity, and/or the data rate from bearer QoS requirement. A UE may support a loading sensitive flow control mechanism that uses an algorithm that is based on the instantaneous or other measure (e.g., average) buffer status and/or eNodeB scheduled UL bandwidth. The flow control mechanism may be capable of buffering the data that is not yet acknowledged to recover from unrecoverable transmission errors on any of the cooperating CCs and/or buffering the data received from the data splitting entity and transmit it based on the bandwidth availability.

In UL data splitting, a UE may also support the configuration to add or remove cooperating CCs dynamically without tearing down the SAE Bearer. A UE may support load monitoring of transmission path to provide periodic and/or event triggered measurement reports on the current buffer status to the data splitting entity and/or periodic and/or event triggered measurement report on the bandwidth utilization.

In UL data splitting, an eNodeB may be configured to schedule (with or without cooperating eNodeB synchronization) bandwidth to a UE and buffer received data and perform reordering of data received from different links to ensure that the data is provided to the upper layers in the order it was sent. This reordering functionality may be use where layers above the entity does generally not have the ability to perform reordering (e.g., such as not having the ability to perform such reordering in the normal course of operation). An eNodeB may also support in-sequence delivery and configuration of affected layers to set up a data path corresponding to the data stream splits.

In UL data splitting, the X2 interface (e.g., tunneling) may support certain functions. The X2 application protocol may provide the configuration, may control the data split entities, and may be responsible for delivering measurement and/or bandwidth reports and/or delivering entity setup, modification, and/or release configuration. The tunneling protocol may connect the data split entity between serving and cooperating eNodeBs to provide for transmitting data between connected eNodeBs and/or transfer data control messages (e.g., reset messages, measurement reports, etc.) between the two connected entities.

In an embodiment, data splitting may be performed at the PDCP layer. An interworking function (PDCP IWF) may be used at a source eNodeB to forward compressed IP packets (PDCP PDU) to a PDCP IWF at cooperating eNodeB before forwarding to the RLC layer for transmit buffering. The PDCP IWF may provide support for multiple radio bearers per SAE bearer.

Figure 4:
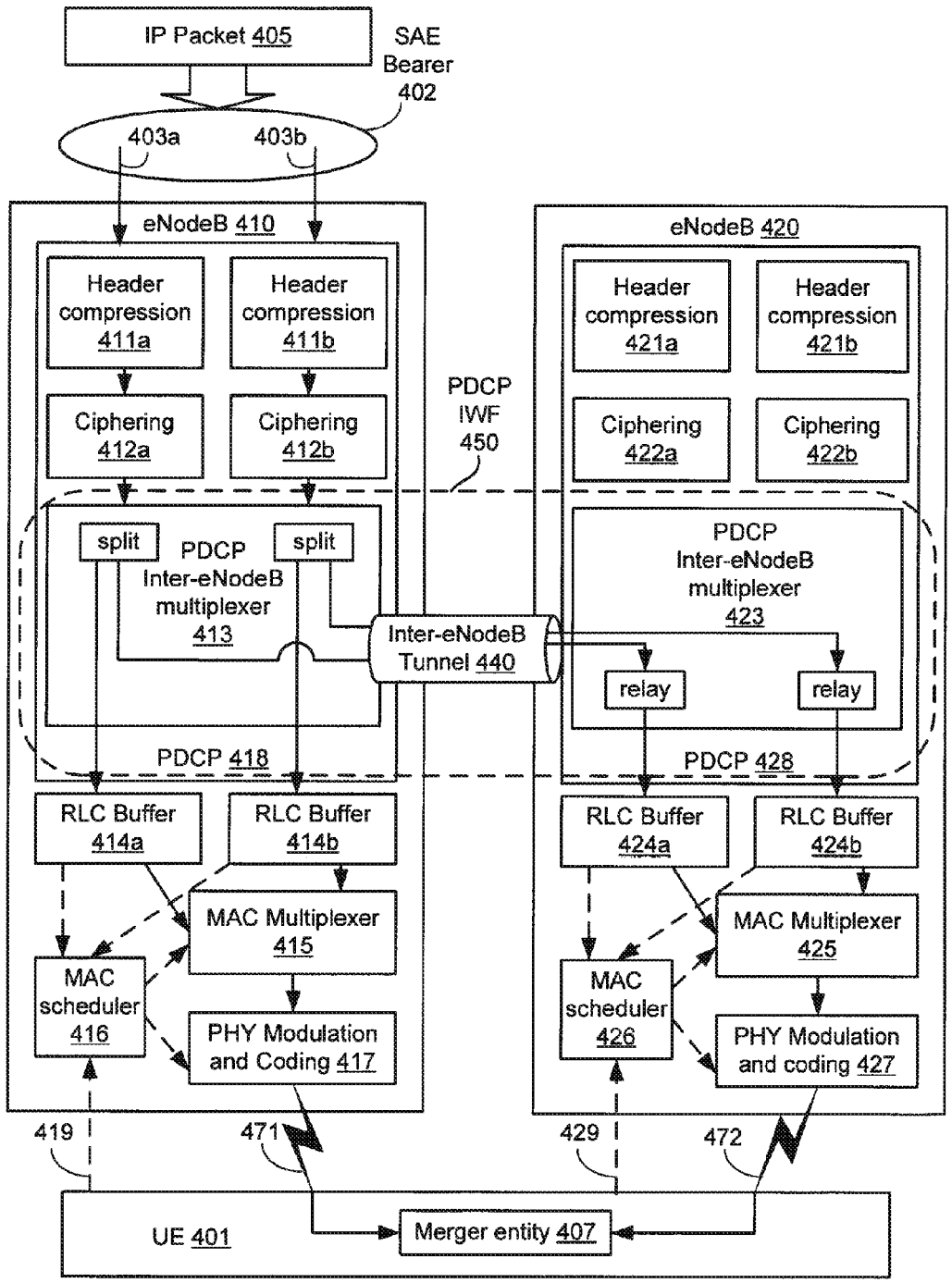
FIG. 4 illustrates a non-limiting exemplary downlink data flow and system configuration.

FIG. 4 illustrates an exemplary DL data flow and system configuration that may be used in data splitting embodiment performing data splitting at the PDCP layer. UE 401 may be in a location that allows it to communicate with both eNodeB 410 and eNodeB 420. IP packet 405 may be received at eNodeB 410 and may have UE 401 as its destination. IP packet 405 maybe transmitted to eNodeB 410 vie SAE bearer 402, which may include radio bearers 403a and 403b. PDCP IWF 450 may facilitate splitting data between eNodeB 410 and eNodeB 420, in part with the use of inter-eNodeB tunnel 440.

IP header compression may be performed at header compression modules 411a and 411b to reduce the number of bits needed to transmit over the radio interface. Robust header compression may be used, in any mode (e.g., unidirectional mode (U-mode), bidirectional optimistic mode (O-mode), and bidirectional reliable mode (R-mode)). O-mode and R-mode may utilize a feedback channel for error recovery. Because compression uses prior frame information, header compression processing performed by header compression modules 411a and 411b may be performed before data splitting with feedback processing being performed in one entity (e.g., only in one entity).

Ciphering and integrity protection of the transmitted data may be performed at ciphering modules 412a and 412b. Inter-eNodeB tunnel 440 may carry a portion of the PDCP PDU as a split data stream sub-flow to cooperating eNodeB 420 but after ciphering to avoid having to signal and maintain multiple hyper-frame numbers (HFN) and PDCP sequence numbers (SN).

Data may be split at the PDCP Inter-eNodeB multiplexer 413, and the data split off for eNodeB 420 may be transmitted to eNodeB 420 via Inter-eNodeB Tunnel 440. The data that is to be transmitted from eNodeB 410 may be provided to RLC buffers 414a and 414b, multiplexed at the MAC layer by MAC multiplexer 415, modulated and encoded at the physical layer by PHY Modulation and Coding module 417, and ultimately transmitted to UE 401 via CC 471. The data that is to be transmitted from eNodeB 420 may be provided to RLC buffers 424a and 424b, multiplexed at the MAC layer by MAC multiplexer 425, modulated and encoded at the physical layer by PHY Modulation and Coding module 427, and ultimately transmitted to UE 401 via CC 472. eNodeB 410 and eNodeB 420 may have MAC schedulers 416 and 426, respectively, that receive channel status data 419 and 429 from UE 401 (e.g., downlink channel quality information) and data from RLC buffers and coordinates the transmission of data with the MAC multiplexers and PHY Modulation and Coding modules.

There may be one PDCP entity per radio bearer configured for a mobile terminal. To support data splitting, a scheduler (e.g., a simple round-robin distribution of received PDCP packet to active sites or based on some splitting algorithm with buffer status or transmit rate feedback from destination eNodeB 420) may be used to forward a PDCP PDU (e.g., containing a portion of IP packet 405) to another site (e.g., eNodeB 420) for transmit via another CC. This configuration provides for two or more (in an embodiment, depending on number of co-transmit sites) data streams (e.g., PDCP/RLC/MAC) set up per radio bearer (e.g., one per participating CC and N for a UE where N is total number of participating CCs). The scheduler residing on the PDCP/RLC interface may be responsible for the scheduling of data forwarding to different sites, including a main serving site and a cooperative site for further processing in RLC layer.

In PDCP IWF 450, a flow mechanism may be used to avoid loss of data in the event of congested or limited physical layer (PHY) bandwidth at cooperating CCs causing a buffer overflow. The flow mechanism may be a feedback-over-tunneling protocol providing data buffer status (e.g., RLC buffer occupancy) and/or instantaneous or some other measure of bandwidth information for a cooperating CC.

Figure 5:
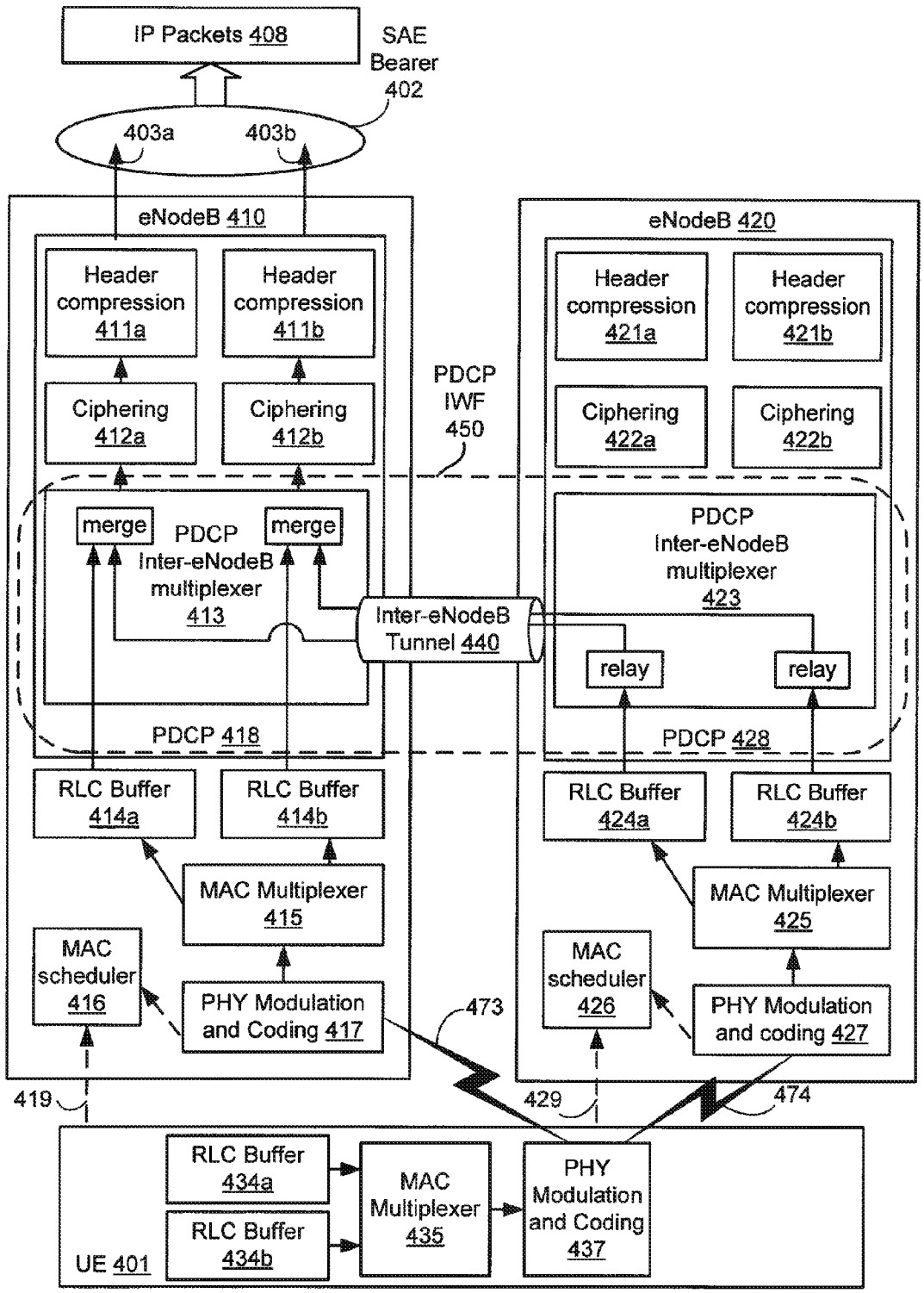
FIG. 5 illustrates a non-limiting exemplary uplink data flow and system configuration.

The corresponding UL data split at the PDCP layer as shown in FIG. 5 utilizes the same module layout as in DL, but reverses the data path direction. Note that for any of the functions performed as described in FIG. 4, the inverse function may be performed by the same modules and/or entities in FIG. 5, or such inverse functions may be performed by different modules or entities. For example, the MAC multiplexers of eNodeBs 410 and 420 may also perform demultiplexing for UL signals. Both DL and UL may be configured with a PDCP entity per each participating CC. In FIG. 5, data merger may be performed at eNodeB 410 by a merger entity of PDCP inter-eNodeB multiplexer 413. In an embodiment, physical layer HARQ ACK/NACK may be handled independently with the transmitting cells.

In FIG. 5, the data that is to be transmitted from UE 401 may be provided by PDCP IWF data split (not shown) to RLC buffers 434a and 434b configured on UE 401, multiplexed at the MAC layer by MAC multiplexer 435, modulated and encoded at the physical layer by PHY Modulation and Coding module 437, split and ultimately transmitted to eNodeB 410 via CC 473 and eNodeB 420 via CC 474. Here again, eNodeB 410 and eNodeB 420 may have MAC schedulers 416 and 426, respectively, that receive channel status data 419 and 429 from UE 401 (e.g., uplink channel quality information).

On a receiver (UE 401 in FIG. 4, or either eNodeB in FIG. 5), data merger may be performed to remerge the data split and in embodiments where the connection is configured for "RLC—in sequence delivery", the merger entity may perform this task instead of the RLC entity since an individual RLC entity may have received a partial PDCP data stream. The data merger may have access to a buffer that may be used to store out-of-order delivery due to different transmission path delay over an air interface (Iu). In FIG. 4, data merger may be performed at UE 401 by merger entity 407. Data splitting at the PDCP layer may have minor impact to established system architectures, requiring changes that are limited to PDCP. This configuration may also minimize configuration changes, and allow for independent PDCP PDU delivery from separate routes/sites (e.g., eNodeBs, RRH, NodeB, etc.).

In implementations that do not use data splitting (or that limit data splitting), a seamless handover may be guaranteed by the RAN with data duplication during preparation before or during the handover (HO). A data route (tunneling to forward the data stream) between the source and target eNodeB may be established before the UE is commanded for HO. After successful HO, the source eNodeB may forward the PDCP packet transmission status (PDCP SN) to a target eNodeB to synchronize transmit status so that no packets are lost.

In data splitting embodiments, the corresponding HO procedure may be performed in several ways. Note that the HO command may be modified to handle multiple CCs. In an embodiment where handover occurs between serving and/or cooperating CCs, a handover similar to a conventional handover may be performed. The CC cooperation configurations may need to be updated to maintain the cooperation structure and, where a handover destination cannot support the needed service quality, the cooperation structure may need to be reorganized. Seamless data transmission may be assured with PDCP SN synchronization. In an embodiment where handover occurs between cooperating CCs, a subset of a conventional handover procedure may be performed, where tunneling may be established between the source cooperating eNodeB and the target cooperating eNodeB. Data forwarding may be handled by either a new tunneling protocol or by reusing an existing GPRS tunneling protocol (in an embodiment, with some modification) between eNodeBs. Additional modification may be performed on handover preparation information (e.g., X2 signaling) and handover commands (e.g., RRC peer message over the air) to indicate that a serving CC has not changed.

The X2 interface may support inter-eNodeB RESOURCE (e.g., cell capacity) STATUS REQUEST and UPDATE. Cell capacity may be provided in terms of a percentage of UL/DL guaranteed bit rate (GBR)/non-GBR/total physical resource block (PRB) usage as well as UL/DL S1 transport network layer (TNL) load (e.g., low/medium/high/over load) or via a new IE that may indicate a number of PDCP PDUs that may be waiting in the RLC transmission buffer. For the purpose of estimating the available bandwidth on cooperating CCs, this may be sufficient for PDCP level data splitting and to optimize the splitting scheduler algorithm efficiency.

For establishing inter-site cooperating data split between CCs, the X2 interface may be handled in several ways. Initial establishment may be treated as a partial handover, in which case the handover preparation information message may be used. In an embodiment, it may not be necessary to create a new X2 signaling protocol for this purpose. In an embodiment, a new X2 signaling message for a source eNodeB to request a target eNodeB to allocate resources (e.g., PDCP/RLC/MAC) may be created that supports cooperative transmission. Such a message may carry sufficient information to support some minimum data rate and QoS. Note that the architecture and configuration shown in FIGS. 4 and 5 may be used with any embodiment disclosed herein, including those that perform data splitting other than at the PDCP layer.

In an embodiment, data splitting may be performed at the RLC layer. In such embodiments, an acknowledge mode (AM) mode bearer may be configured, but the disclosure set forth herein may be implemented with bearers of other modes. Data splitting may be achieved by splitting a single stream of data received from higher layers into multiple streams of data. Each stream of the split data may be referred to as a flow herein. Each flow may be analogous to an RLC entity as it is currently defined in 3GPP standards documents. Each flow may be input into a device (e.g., an eNodeB) as service data units (SDUs) with sequence numbers and may be output from the device as a stream of SDUs. Within the device, the SDUs may be broken down into protocol data units (PDUs) and may be reassembled on a peer node.

On a transmitting entity, additional functionality performed at the RLC layer may include a data splitter entity that is responsible for splitting the data into one or more flows. Each flow on the transmitting side is functionally equivalent to a current version of the RLC. The data split entity may ensure that all the SDUs it receives from upper layers are buffered even if some of the SDUs are sent on a CC to an eNodeB so that the data can be retransmitted if there is a transmission failure, for example over the radio line, or some other problem between one of the CCs and the UE.

On the a receiving entity the flow is similar to current RLC functionality with the exception that the flow entity may not handle reordering SDUs. This function maybe performed by a data merge entity. A data merge entity may receive inputs from one or more flows and may buffer and reorder the SDUs before sending them to higher layers.

Figure 6:
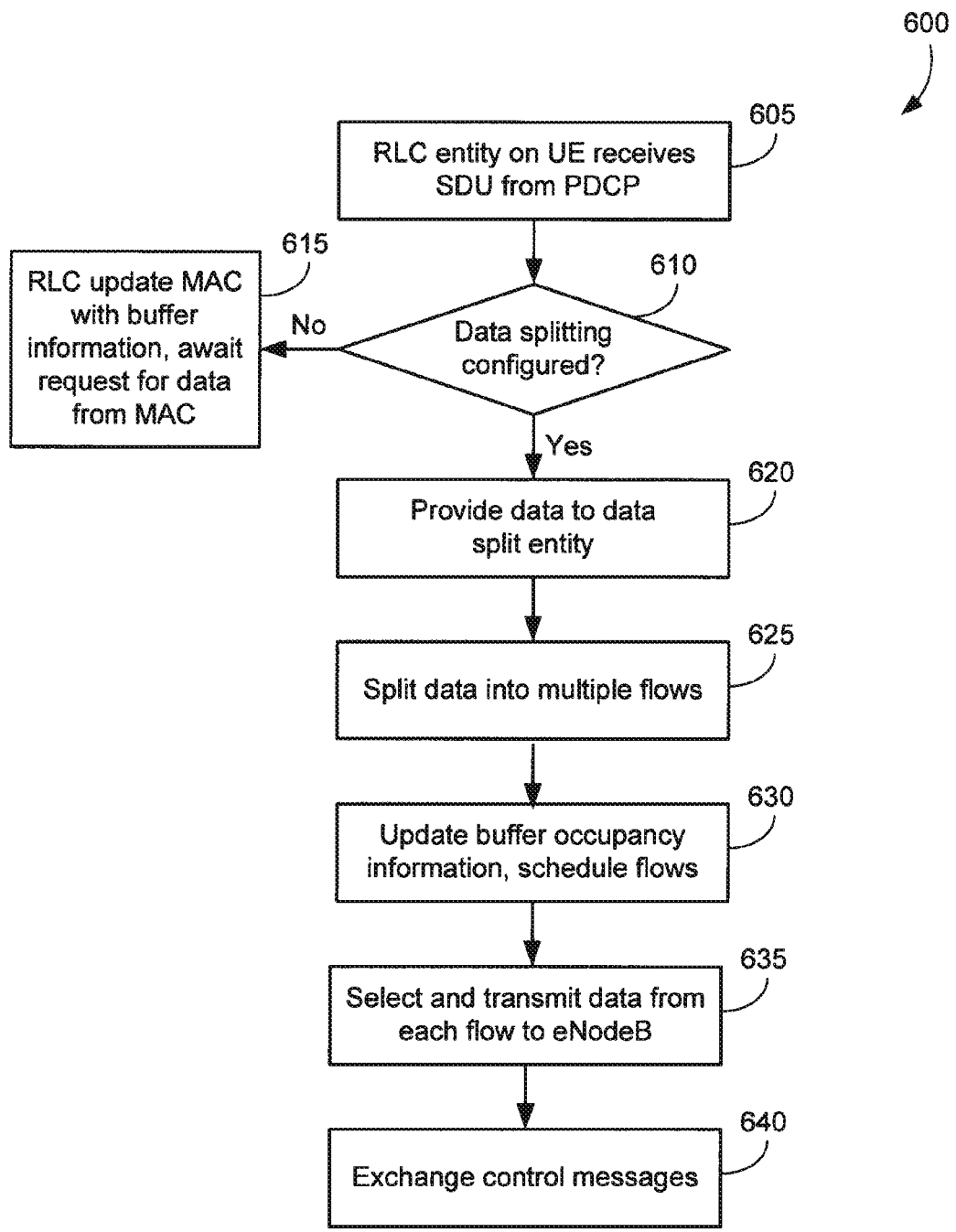
FIG. 6 illustrates a non-limiting exemplary method of splitting data.

FIG. 6 illustrates method 600 of performing UL data splitting at the RLC layer. At block 605, an RLC entity on a UE may receives an SDU from PDCP. At block 610, a determination is made as to whether data splitting is configured. Without data split configured, at block 615 RLC may update the MAC layer with the buffer information and await a data request from MAC. If data splitting is configured, at block 620, the data may be provided to the data split entity residing on the UE. The data split entity may split the data into multiple flows at block 625 (where each flow may act like an RLC AM entity by itself). The decision on how the data is to be split may be based on multiple factors including the bandwidth available on each CC based on input from MAC and the current buffer status on each flow. Once the data has been split into flows for each CC, at block 630 buffer occupancy information may be updated for MAC, and the MAC entity may determine the scheduling of the data for transmission over the air. The MAC scheduler may be modified to accommodate the concept of multiple flows.

At block 635, the MAC scheduler entity may select data from each flow and forward it to PHY for transmission to the destination eNodeB over an air interface (Iu). Upon receiving data on each flow at the eNodeBs, at block 640 appropriate control messages are exchanged between the UE and the eNodeB on the same flow for acknowledging the data or for requesting a retransmission. Note that once the PDUs are assembled into an SDU, all the flows may be transmitted to the primary eNodeB that has the connection to the Enhanced Packet Core Network (EPC) for the given UE. As the flows are acting independently, any RLC control information (retransmission request, reset, etc.) may be handled by the appropriate entity that is handling the given flow. Because the correct entity is handling the control information, latency in handling retransmission requests may be reduced.

The RLC entity on the primary eNodeB that receives the flows from other RLC entities provides the data to a merge functionality or entity. The merge entity is responsible for merging the received data and for making sure that the data is in order before it is provided to PDCP.

Figure 7:
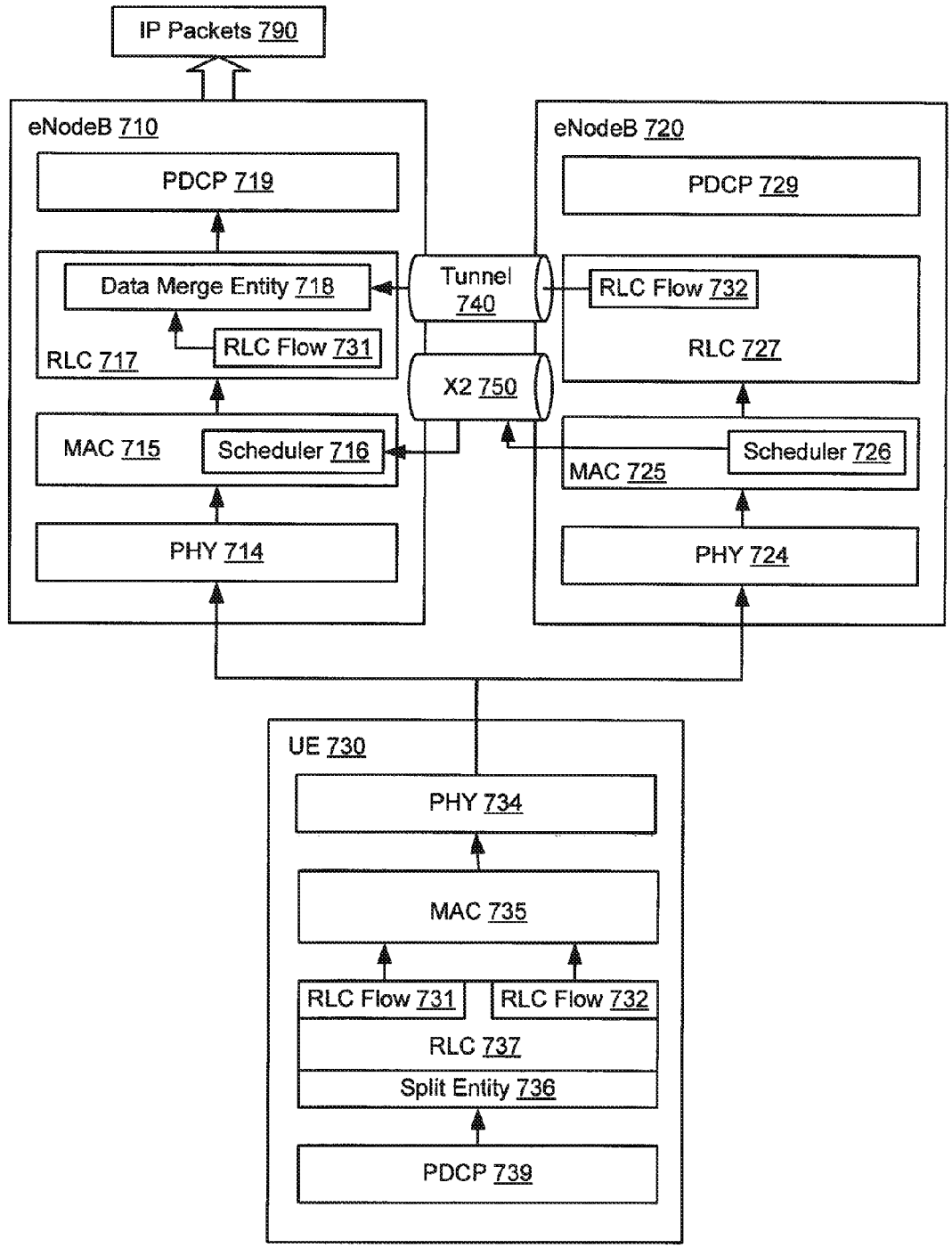
FIG. 7 illustrates a non-limiting exemplary uplink data flow and system configuration.

FIG. 7 illustrates an exemplary data flow and architecture that may be used in accordance with an embodiment where RLC layer data splitting is performed. UE 730 may receive data at PDCP layer 739 and provide the data to RLC layer 737. At RLC layer 737, data split entity 736 splits the data into flows 731 and 732, which are provided to MAC 735. Data split entity 736 may track RLC SDUs as it divides the data into separate flows. MAC 735 may provide the data to PHY 734, which may transmit distinct portions of the data over different CCs (as flows 731 and 732) to eNodeB 710 and eNodeB 720.

eNodeB 720 may receive the data at PHY 724 and provide it to MAC 725, which in turn provides the data of flow 732 to RLC 727. RLC 727 may then provide the flow data to eNodeB 710 via tunnel 740. At eNodeB 710, data flow 731 may be received at PHY 714 which may provide it to MAC 715, which in turn provides the data of flow 731 to RLC 717. Data merge entity 718 of RLC 717 may then merge the data flows into properly ordered SDUs and provide the resultant data to PDCP 719, which may transmit the data as IP packets to a network. Data merge entity 718 may track RLC SDUs. X2 signaling 750 may be used to exchange control information between eNodeB 710 and eNodeB 720.

Figure 8:
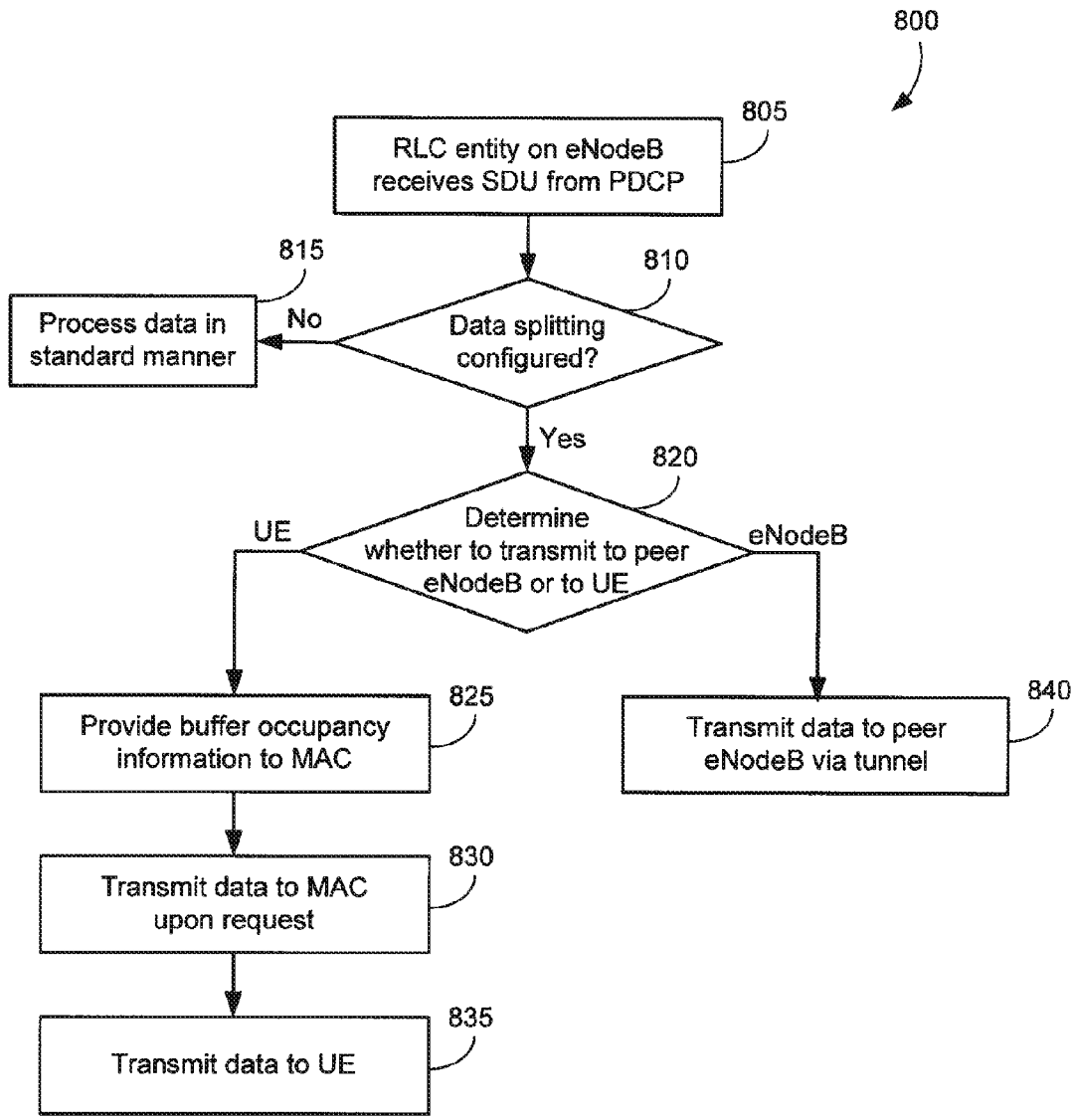
FIG. 8 illustrates a non-limiting exemplary method of splitting data.

FIG. 8 illustrates method 800 of performing DL data splitting at the RLC layer. At block 805, an RLC entity on an eNodeB entity that has context with the EPC for the given UE receives the data that is destined for the UE. In normal mode when there is no CC involved, this may result in a change in the total buffer occupancy for the channel. At block 810, the RLC entity on the eNodeB may determine whether data split is configured. If so, at block 820 the RLC entity may check with the data splitting entity to determine if the SDU is to be transmitted to the peer eNodeB or if it is available for local transmission. If data splitting is not configured, processing the received data may proceed normally at block 815.

At block 820, the data splitting entity may determine if the data is to be sent to the peer RLC or not based on a range of factors that may include the bandwidth available at the peer entity, current buffer status of the peer entity, etc. As the instantaneous buffer status may not be available over the X2 interface, the algorithm that determines the data split may determine the split based on assumed data rate or the last reported measurements and predictions based on the time since the last reported measurements.

If the data is to be sent on the local flow (i.e., from the eNodeB directly to the destination UE), buffer occupancy information may be provided to MAC to be updated at block 825, and at block 830, the RLC may transmit the data to the MAC layer when the data is requested. The data may be transmitted to the UE at block 835.

If the data is to be sent to a different eNodeB, it may be sent over the eNodeB-eNodeB tunnel to the peer eNodeB at block 840. The receiving RLC on the peer eNodeB may behave the same way as if it received the data from upper layers. The difference may be that the RLC transmission status feedback (e.g., RLC buffer status and the information about SDUs not transmitted) is forwarded to the RLC data split entity on the source eNodeB by the cooperating RLC entity. This may enable the data split entity to transmit a failed packet over another available CC as well as maintaining an up-to-date buffer status for a seamless handover.

The RLC entity on each CC may update the buffer occupancy information it provides to the MAC layer. A MAC entity may schedule the data transmission based on the data and bandwidth availabilities. On the UE side, upon receipt of data from the MAC the reassembly functionality may be performed as per the current RLC standard independently for each flow. If there is any RLC Control information that has to be transmitted, the MAC on the UE side may be informed of the flow on which the data is to be transmitted. Once the SDUs are formed they are provided to the data merge functionality that is responsible for reordering the SDUs (if it is so configured). The SDUs may be ordered before they are sent out of RLC to the PDCP layer. Reordering may be done based on the sequence numbers added to the SDU or based on the sequence number provided by PDCP.

Figure 9:
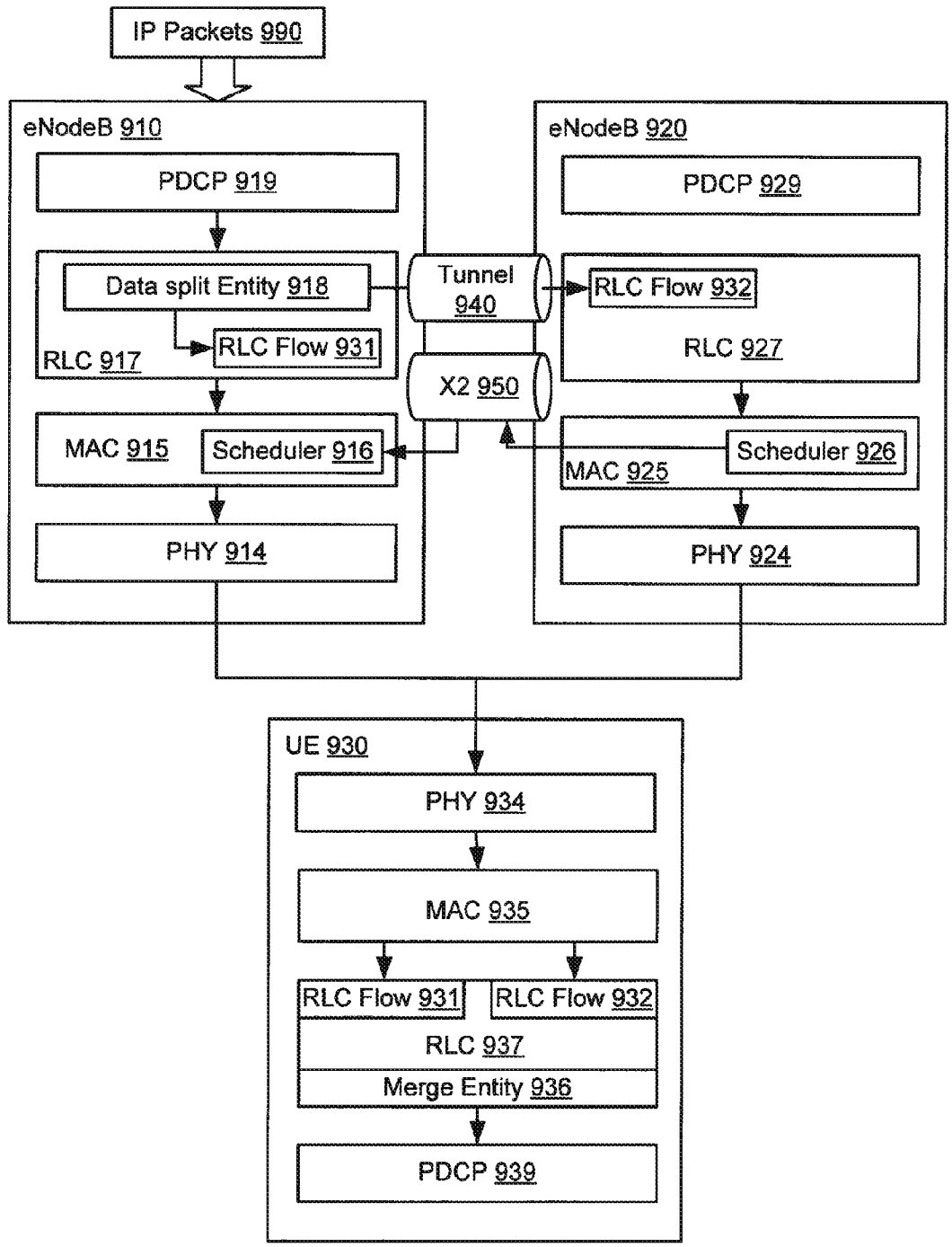
FIG. 9 illustrates a non-limiting exemplary downlink data flow and system configuration.

FIG. 9 illustrates an exemplary data flow and architecture that may be used in accordance with an embodiment where RLC layer data splitting is performed. eNodeB 910 may receive IP packets 990 at PDCP layer 919 and provide the data to RLC layer 917. At RLC layer 917, data split entity 918 may split the data into flows 931 and 932. Data split entity 918 may determine that flow 932 is to be transmitted to a peer eNodeB while flow 931 is to be transmitted locally (i.e., directly to UE 930). Data split entity 918 may provide flow 931 to MAC 915 (e.g., upon request after updating buffer occupancy information). Data split entity 918 may track RLC SDUs as it divides the data into separate flows. MAC 915 may provide the data for flow 931 to PHY 914, which may transmit flow 931 over a first CC to UE 930.

eNodeB Flow 910 may provide flow 932 to eNodeB 920 via tunnel 940. RLC layer 927 may provide flow 932 to MAC 925 (e.g., upon request after updating buffer occupancy information). MAC 925 may provide the data for flow 932 to PHY 924, which may transmit flow 932 over a second CC to UE 930. X2 signaling 950 may be used to exchange control information between eNodeB 910 and eNodeB 920.

At UE 930, data flows 931 and 932 may be received at PHY 934 which may provide them to MAC 935, which in turn provides the data of flows 931 and 932 to RLC 937. Data merge entity 936 of RLC 937 may then merge the data flows into properly ordered SDUs and provide the resultant data to PDCP 939, which may transmit the data as IP packets to a network. Data merge entity 938 may track RLC SDUs.

For RLC layer data splitting embodiment, handover operations may be performed using any means or methods disclosed herein, including the mean disclosed in regards to PDCP layer data splitting.

In an embodiment, data splitting may be performed at the MAC layer. A MAC IWF may be configured on a source eNodeB that forwards RLC packets (e.g., PDUs) to a MAC IWF configured on a cooperating eNodeB that may provide transmit buffering. Note that MAC layer data splitting may be applied as described herein to high speed packet access (HSPA) configurations as well as LTE and LTE-A configurations. In an HSPA configuration, a serving eNodeB in LTE-A may be equivalent to a serving radio network controller (RNC) in HSPA, and a cooperating eNodeB in LTE-A may be equivalent to a NodeB or an RNC in HSPA.

Figure 10:
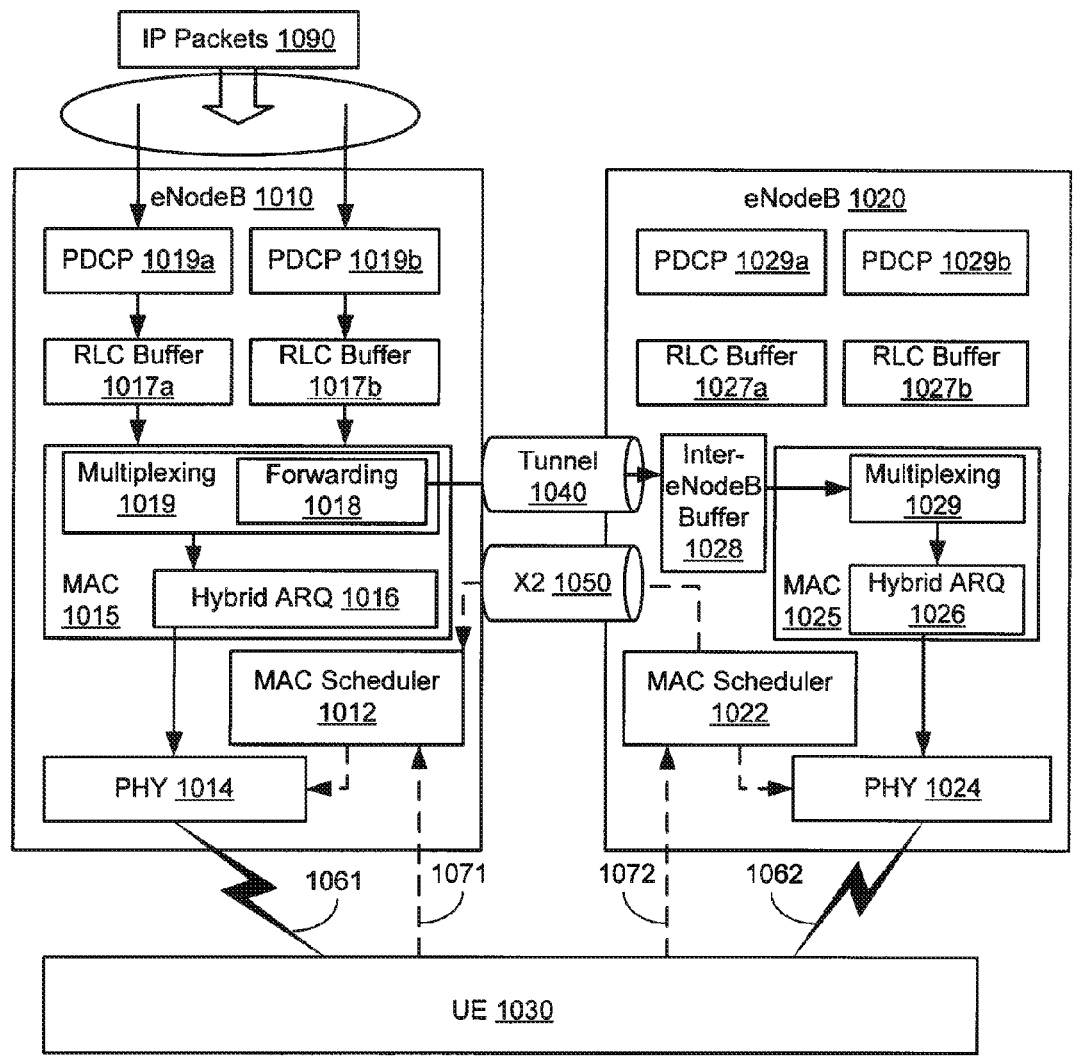
FIG. 10 illustrates a non-limiting exemplary downlink data flow and system configuration.

FIG. 10 illustrates an exemplary DL data flow and architecture that may be used in accordance with an embodiment where MAC layer data splitting is performed. eNodeB 1010 may receive IP packets 1090 at PDCPs 1019*a* and 1019*b* which may perform PDCP encoding and provide the data to RLC buffers layer 1017*a* and 1017*b*. RLC buffers 1017*a* and 1017*b* may provide the data to MAC 1015, which may include multiplexing entity 1019 that may determine the appropriate data split and splits the data into at least two portions. Multiplexing entity 1019 may take into account the available bandwidth for peer eNodeBs, and may forward the RLC PDU in performing data multiplexing. The data that is determined to be sent using a peer eNodeB may be provided to eNodeB 1020 by forwarding entity 1018 via inter-eNodeB tunnel 1040. The data that is determined to be transmitted locally (i.e., directly from eNodeB 1010 to UE 1030 may be provided to hybrid ARQ (HARQ) entity 1016 that may perform any HARQ functions, and forward the data to PHY 1014 for transmission 1061 using a first CC to UE 1030.

eNodeB 1020, upon receipt of data for UE 1030 from eNodeB 1010 via inter-eNodeB tunnel 1040, may buffer such data at inter-eNodeB buffer 1028. Buffer 1028 may provide the data to MAC 1025 for multiplexing by multiplexing entity 1029 and HARQ functions performed by HARQ entity 1026. The data may be provided to PHY 1024 for transmission 1062 using a second CC to UE 1030.

MAC scheduler 1012 on serving eNodeB 1010 may use reported (e.g., estimated or predetermined guaranteed or averaged transmission, etc.) supporting data rate from cooperating eNodeB 1020 as the reference in the payload selection algorithm to request the RLC PDU to be forwarded to cooperating inter-site CC for transmission.

MAC scheduler 1022 at cooperating eNodeB 1020 may report (e.g., an estimated, predetermined, or calculated guaranteed or average transmission, etc.) data rate that can be supported on eNodeB 1020 to serving eNodeB 1010 on a periodic basis, updating the supporting rate while a connection exists between the two eNodeB. This and other control information may be exchanged between eNodeBs via X2 signaling interface 1050. In an embodiment, X2 interface per cell radio resource status may be requested but the update of radio resource status that provides DL/UL GBR/non-GBR/Total PRB may be optional. The PRB status may also be used as an alternative for scheduling input if such information is available.

MAC scheduler 1022 at cooperating eNodeB 1020 may also perform standard payload selection for the cooperating CC using the RLC PDU buffers available in inter-eNodeB buffer 1028 either as a fixed size PDU or resize by multiplexing 1029 for available radio resources. RLC PDU size selection may be performed by serving eNodeB MAC scheduler 1012 to accommodate the reported supporting data rate or the guaranteed rate.

MAC inter-eNodeB data forwarding entity 1018 on eNodeB 1010 may be a passive relay unit that may deliver MAC data to PHY for processing and/or to eNodeB 1020 via tunnel 1040.

MAC inter-eNodeB buffer 1028 at cooperating eNodeB 1020 may serve as a temporary "parking" area on cooperating eNodeB 1020 to accommodate variable latency that may be due to data tunneling on X2 interface.

Inter-site tunnel 1040 may be a data pipe that forwards RLC PDUs from serving eNodeB 1010 to cooperating eNodeB 1020. There may be one tunnel per each cooperating eNodeB.

The configuration and data flow described herein in regard to FIG. 10 and MAC layer data splitting may be implemented with minor impact to the system architecture and with changes limited to the MAC layer. Such changes may be minimal, and may be configuration changes that may be the same or with minor differences from those required to support Coordinated Multipoint Transmission (CoMP) procedures. In an embodiment, some of the CoMP procedures may be reused with some modification. In an embodiment, air interface resource reservation for participating sites may be used to reduce X2 interface delay. RLC SDU or in-sequence delivery may require that all relevant RLC PDUs be received correctly before RLC can deliver them to the upper layers. Note that the RLC PDUs may be transmitted over two different physical layer interfaces, each of which may have different latency than the other. Therefore, there may be a requirement on a receiving RLC entity to buffer additional input data. The cooperating CC may need to transmit the RLC PDU within the upper layer retransmit timer limit.

Figure 11:
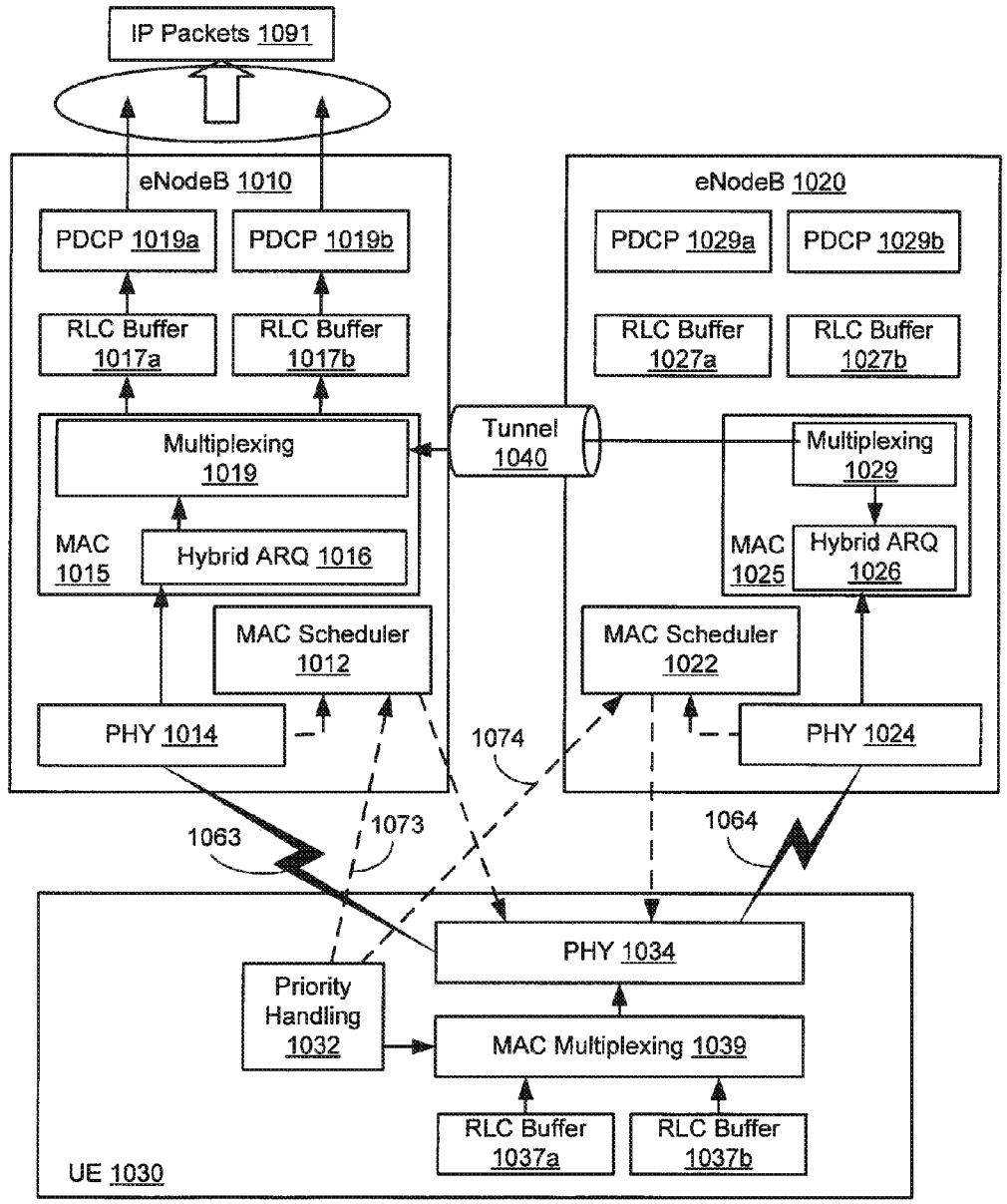
FIG. 11 illustrates a non-limiting exemplary uplink data flow and system configuration.

The corresponding UL MAC layer data split data flows and architectures are illustrated in FIG. 11, using the same devices and entities described for FIG. 10. The functions shown in FIG. 11 may be mostly or entirely compatible with existing LTE and/or LTE-A signaling structures, but may also include the enhancement of the configuration for multiple CCs and corresponding scheduling from network. The corresponding network requirement to forward successfully received MAC PDUs to RLC on a serving eNodeB may be the same as what is needed to introduce CoMP procedures.

In FIG. 11, data may be received at RLC buffers 1037a and 1037b on UE 1030, and may be provided to MAC multiplexing entity 1039 that may determine the data split and provide the data to PHY 1034 for transmission on separate CCs 1063 and 1064 to eNodeB 1010 and 1020, respectively. Priority handling data may be used by MAC multiplexing entity 1039. Such data may be exchanged between priority handling entity 1032 and MAC schedulers 1012 and 1022. Upon receipt of data directly from UE 1030, PHY 1014 of eNodeB 1010 may provide the data to MAC 1015, which may perform HARQ functions and provide the data to multiplexing entity 1019. Multiplexing entity 1019 may demultiplex the data with the data received from eNodeB 1020 via tunnel 1040. Upon receipt of data directly from UE 1030, PHY 1024 of eNodeB 1020 may provide the data to MAC 1025, which may perform HARQ functions and provide the data to multiplexing entity 1029, which may demultiplex the data and provide it to eNodeB 1010 via tunnel 1040. After demultiplexing, the data may be provided to RLC buffers 1017a and 1017b, PDCP decoders 1019a and 1019b, and then transmitted to the network as IP packets 1091. Buffer status 1073 and 1074 may be provided by UE 1030 to MAC schedulers 1012 and 1022, respectively.

In MAC layer data splitting embodiments, basic handover features supported by LTE R8 may support handover as described herein with the addition of a configuration that supports reorganizing and/or maintaining a cooperation structure and support of partial handover on the X2 signaling interface. Partial handover of a serving CC or cooperating CCs may use the establishment of an additional data path between eNodeBs. There may be no need for data copy since MAC packet lost during path establishment or reestablishment may be handled autonomously with RLC level retransmission (for cooperating CC handover since RLC is always on the serving CC and may not have moved) or PDCP retransmission (for serving CC handover since PDCP transmission status is forwarded to a target cell). The X2 handover signal interface may encapsulate the handover preparation information defined by the RRC layer. Therefore, the signaling issue of communicating a partial handover may be addressed with the modification of an RRC handover message to provide the context of the cooperation structure in handover preparation information.

In an embodiment, user plane data splitting may be implemented in an exemplary system. In PDCP layer, RLC layer, MAC layer, or serving gateway data splitting, or in a system that uses any combination of any of these and/or any other means disclosed herein, for an efficient data-splitting decision, the serving eNodeB may need to take into account the resources available and local scheduling information from the remote eNodeBs. In RAN data splitting embodiments, a specialized "inter-working function" may be used to buffer downlink frames to mitigate the delay introduced by X2 link. The serving eNodeB may consider the X2 delay and may reduce X2 latency by initiating a serving gateway (S-GW) data-split instead of a RAN data split. Upon determining that data splitting is to be used, a serving eNodeB may transmit a control signal to a serving gateway instructing the serving gateway to begin splitting data.

In an embodiment, user-plane load on the X2 interface may be reduced by building the framework to allow the data-splitting to occur at the Serving Gateway, and extending the LTE R8 handover to allow for carrier-specific handover. In order to implement such an embodiment, a message sequence that allows a serving eNodeB to indicate the carrier-specific handover decision to the Serving Gateway and enable it to split the UE traffic in a carrier-specific manner may be used. In an embodiment implementing carrier-specific handover, eNodeB-MME messaging may be extended to support an indication of a handover of a list of affected radio access bearers (RABs), and require the MME to support carrier-specific PATH_SWITCH_REQUEST messages.

In an embodiment, for example as shown in FIG. 3 where UE 350 may be connected to two eNodeBs when at position 311, proper RRC signaling may be needed to support a split RRC connection. In some implementations, an eNodeB UE context may be established when the transition to an active state for a UE is completed or in a target eNodeB after completion of a handover resource allocation during handover preparation. An eNodeB UE context may be a block of information in an eNodeB associated with one active UE. This block of information may contain the necessary information required to maintain the E-UTRAN services towards the active UE. UE state information, security information, UE capability information and the identities of the UE-associated logical S1-connection may be included in the eNodeB UE context.

Figure 12:
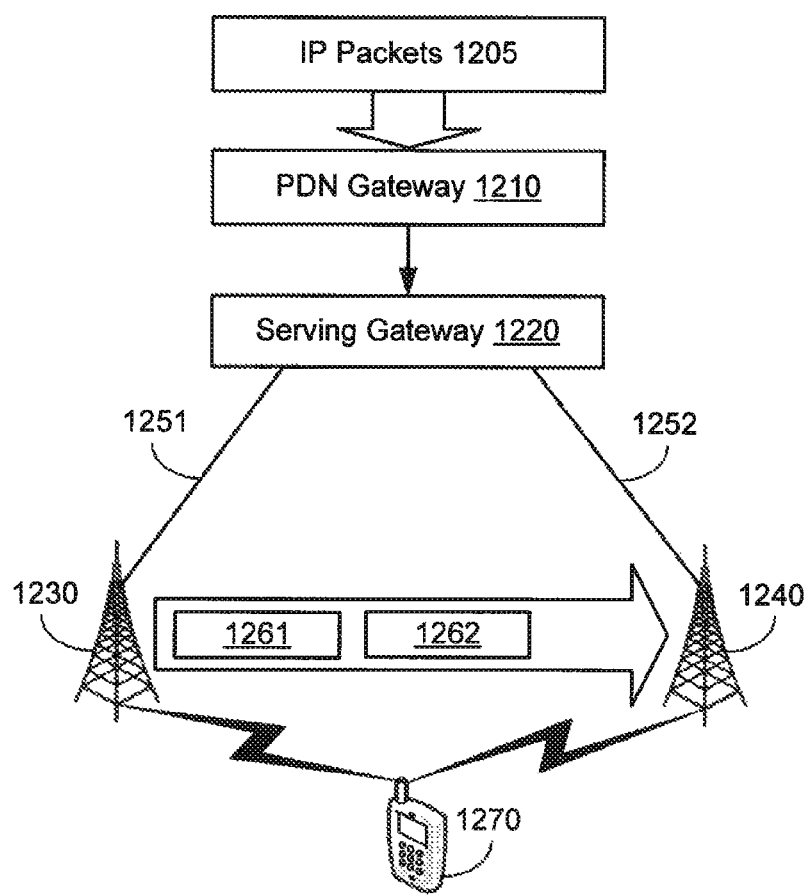
FIG. 12 illustrates a non-limiting exemplary downlink data flow and system configuration.

In an embodiment, user plane data splitting may be performed at a serving gateway, as illustrated in FIG. 12. IP packets 405 may be received at packet data network (PDN) gateway 1210 and transmitted to serving gateway 1220. Serving gateway 1220 may split the data and transmit one portion of the data to eNodeB 1230 via S1 bearer 1251 and the other portion of the data to eNodeB 1240 via S1 bearer 1252. eNodeBs 1230 and 1240 may then transmit the data to UE 1270 via radio bearers. Unacknowledged PDCP SDUs 1261 and 1262 may be transferred between eNodeBs to allow for lossless handover. Data-splitting for bearers associated with individual CCs at the serving gateway may be enabled based on input from the eNodeB and/or a load-balancing algorithm running on the Serving Gateway. A single component carrier may be associated with a HARQ entity. Logical channels may be transparently mapped to the different component carriers.

When a CC is handed over from one eNodeB (source) to another (target), the source eNodeB may indicate to the MME associated with the Serving Gateway (either directly or through a target eNodeB) the radio bearers that were being carried on the component carrier. This may be achieved by creating a message to be transmitted from the source eNodeB to the MME associated with the Serving Gateway, or by extending the Path Switch Request Message.

The Path Switch Message may be exchanged between an eNodeB and an MME to request the switch of a downlink GPRS tunneling protocol (GTP) tunnel towards a new GTP tunnel endpoint. The Path Switch Message may carry the EUTRAN RAB (E-RAB) to be switched in the Downlink List information element (IE), which may be the list of all the E-RABs that need to be switched from the source eNodeB to target eNodeBs. If the E-RAB to be switched in the Downlink List IE in the PATH SWITCH REQUEST message may not include all E-RABs previously included in the UE Context, the MME may consider the non included E-RABs as implicitly released by the eNodeB.

To support carrier-specific handover, the Path Switch Request (or an alternate message) may carry a list of RABs that need to be switched. However, the MME and Serving Gateway may continue forwarding the rest of the traffic to the source eNodeB as before.

An eNodeB may determine how to request the splitting of data at the Serving Gateway (S-GW). In an embodiment, an eNodeB may request data-splitting at the RAB level, in which case the Path Switch Message may include a list of all RABs that need to be split. If the eNodeB does not want to split data at the RAB level, it may send an indicator with the percentage of traffic that should be redirected to the new eNodeB. In an embodiment, a "RAB to keep" list may be used to avoid potential compatibility or interpretation issues with older equipment. A serving eNodeB may also implement a routing algorithm to decide the optimum RAB/RB mapping based on AS information that may not be available to MME. An optional IE that provide routing suggestions may be included in the "PATH SWITCH REQUEST" where MME/S-GW may decide to adopt the data split routing as suggested by an eNodeB or alternatives. Some potential active inputs to the decision of determining data split routing may include RB/RAB split assignment (mapping of RAB/RB to specific eNodeB MAC address), percentage of data split, and other inputs.

Partial data from a radio bearer may be sent on a component carrier, and this may be indicated by a special indicator to allow the Serving Gateway the option to split the traffic to mirror a similar arrangement. The special indicator may be a one-time event, or a periodic notification from the serving eNodeB to the S-GW/MME to change the splitting ratio based on channel quality measurements.

MME/S-GW may implement some routing intelligence that is used to make the data flow split decision based on eNodeB-provided status inputs. Such inputs may include available eNodeB (e.g., PDCP) buffer, mean transmission latency (e.g., on UE or per specific RAB/RB), supportable traffic loading distribution (e.g., % load per eNodeB), and others.

Note that the packets sent from an S-GW may be IP traffic encapsulated in GTP tunnels, and may require the creation of two GTP tunnels, one terminating at the source eNodeB and another terminating at the target eNodeB for a single E-RAB identity. This may vary from some implementations that mandate a one-to-one RAB to radio bearer mapping.

In an embodiment, a UE may have one RRC connection with the network, with one special cell that would provide security and NAS information. Referring again to FIG. 3, at startup, UE 350 at position 311 is associated with an RRC connection with eNodeB 361, and established component carrier set of CC 320 and CC 330B. Hence, UE 350 may be associated with a serving cell (or special cell) at eNodeB 361, and may get the security and NAS mobility information from eNodeB 361 until a serving cell handover takes place.

To support mobility in the co-operative component carrier deployment, where CC 330 is a serving cell, UE 350 moving to position 311 may cause an RRC Connection Handover, signaled using RRC Connection Reconfiguration, and may cause the reset of the MAC/RLC layers to account for new security parameters. In an embodiment where CC 330 is not a serving cell, UE 350 may maintain its RRC Connection with eNodeB 361 as it moves from position 310 to Position 311. Security procedures may need additional mechanisms for handover as described below.

An eNodeB UE context may be established when the transition to active state for a UE is completed or in a target eNodeB after completion of handover resource allocation during handover preparation. In an embodiment, a handover procedure may trigger the target eNodeB and the UE to generate fresh keys for a ciphering and encryption algorithm, derived from a $\{K_{eNB^*}, NCC\}$ pair sent from a source eNodeB. The target eNodeB may use this tuple to generate a fresh $K_{eNB}$. The $K_{UPenc}$ key (derived from $K_{eNB}$) may be used for the protection of user plane traffic with a particular encryption algorithm.

In an embodiment where UE 350 of FIG. 3 maintains an RRC Connection with source eNodeB 361 as it moves from, for example, from position 310 to position 311, the PDCP entity running in target eNodeB 362 may need to continue using the same keys as source eNodeB 361. This may allow the UE to receive PDCP entities from different eNodeBs simultaneously. These keys may be exchanged with the Handover Command in the handover preparation phase of handover from the source eNodeB to the target eNodeB. In an embodiment, this information may be conveyed during the Initial Context Setup from the S-GW.

In an embodiment, uplink reports, including power headroom, buffer status reports, and channel quality reports, may be available at a target eNodeB, and may either be transferred from a source eNodeB to target eNB over X2-AP, or the UE may send the reports separately to the two eNodeBs. To provide backward compatibility, the UE may send the reports on the serving cell to the "serving eNodeB". However, this may introduces latency in the availability of input for the scheduler at the target eNodeB, which may result in some implementations in non-optimum scheduling decisions.

In order to properly support handover in LTE-A with carrier aggregation, per carrier UE measurement and reporting over aggregated downlink carriers may need to be defined, including carrier-specific RSRP and/or RSRQ. LTE R8 mechanisms may not support intra-frequency measurements because measurements may be based on serving cells. For example, an eNodeB may own three carriers F1, F2, and F3, and may be using F1 and F2, and F1 may be the serving cell. When the signal quality of F3 is better than F2, it may be desirable to have a measurement scheme to handle this situation so that the UE can report this situation. Carrier-specific measurements, including from non-serving cells, may be desired in some implementations.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for transmitting data comprising:
   receiving, at a first base station, internet protocol (IP) packets comprising data, wherein the IP packets are associated with a first wireless transmit and receive unit (WTRU);
   determining, at the first base station, that a portion of the data is to be transmitted to at least one cooperating network element for transmission to the WTRU;
   transmitting, from the first base station, the portion of the data to the at least one cooperating network element; and
   transmitting, from the first base station, a remainder of the data to the WTRU.

2. The method of claim 1, wherein determining that the portion of the data is to be transmitted to the at least one cooperating network element is performed by a Packet Data Convergence Protocol (PDCP) entity configured on the first base station.

3. The method of claim 1, wherein determining that the portion of the data is to be transmitted to the at least one cooperating network element is performed by a Radio Link Control (RLC) entity configured on the first base station.

4. The method of claim 1, wherein determining that the portion of the data is to be transmitted to the at least one cooperating network element is performed by a Media Access Control (MAC) entity configured on the first base station.

5. The method of claim 1, wherein the at least one cooperating network element comprises at least one of a base station, a remote radio head (RRH), and a sector antenna.

6. The method of claim 1, wherein the first base station uses an interactive procedure and associated control information to determine the portion of the data to be transmitted to the at least one cooperating network element.

7. The method of claim 1, wherein the remainder of the data is transmitted to the WTRU from the first base station using a first component carrier, and wherein the portion of the data is transmitted to the WTRU from the at least one cooperating network element using a second component carrier.

* * * * *